United States Patent [19]

Leuschner et al.

[11] 4,205,598
[45] Jun. 3, 1980

[54] ELECTRIC COFFEE MAKER

[75] Inventors: Udo Leuschner, Traunwalchen; Fritz John, Traunreut, both of Fed. Rep. of Germany

[73] Assignee: Bosch-Siemens Hausgeräte GmbH, Stuttgart, Fed. Rep. of Germany

[21] Appl. No.: 954,309

[22] Filed: Oct. 24, 1978

[30] Foreign Application Priority Data

Nov. 14, 1977 [DE] Fed. Rep. of Germany ....... 2750800

[51] Int. Cl.² ............................................. B01F 31/10
[52] U.S. Cl. ........................................ 99/307; 99/316
[58] Field of Search ................. 99/300, 301, 304, 306, 99/307, 313, 316, 317, 279, 281

[56] References Cited

U.S. PATENT DOCUMENTS

| 2,462,349 | 2/1949 | Battilani | 99/306 |
| 2,550,902 | 5/1951 | Beckelman | 99/317 |
| 3,358,583 | 12/1967 | Lepoix | 99/307 |
| 4,070,956 | 1/1978 | Brown | 99/304 |

FOREIGN PATENT DOCUMENTS 7025972 1/1970 Fed. Rep. of Germany ............. 99/307

Primary Examiner—Robert W. Jenkins
Attorney, Agent, or Firm—Herbert L. Lerner

[57] ABSTRACT

An electric coffee maker having a coffee pot in the form of a Dewar flask supported in a shock-proof outer housing surrounding the flask. A fresh water container and a coffee filter are disposed above the coffee pot. An electric flow-through heater is disposed in the housing below the top of the Dewar flask. Fresh water conduit means are conducted from the fresh water container through the interior of the housing to the flow-through heater. The hot-water conduit means from the heater to the top of the filter are routed through a handle formed from the housing.

4 Claims, 4 Drawing Figures

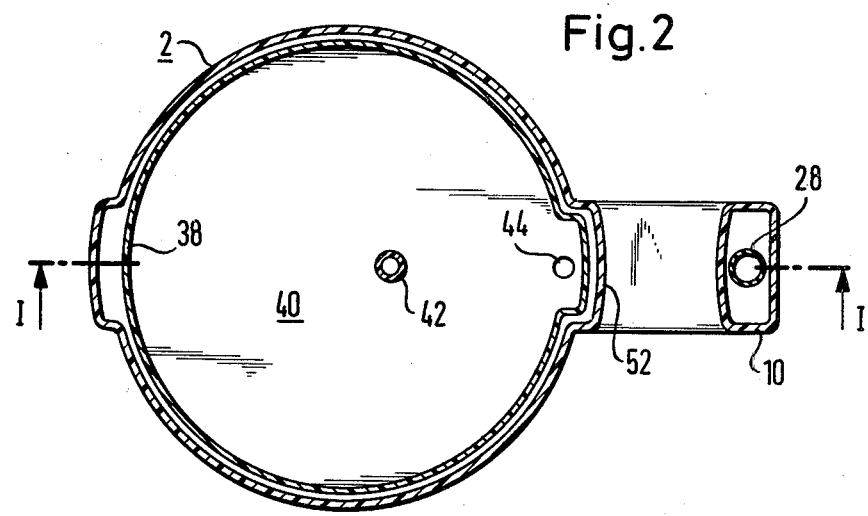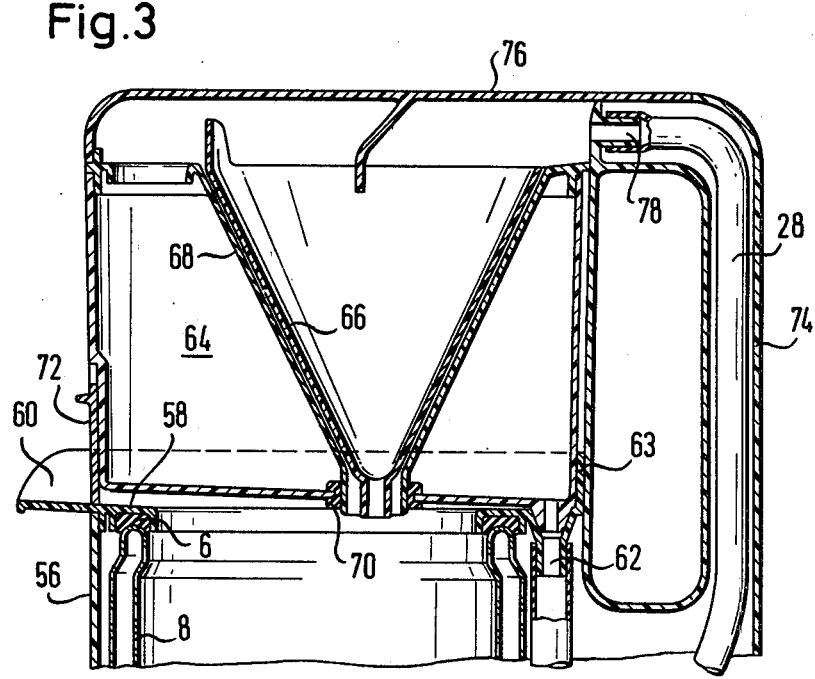

ELECTRIC COFFEE MAKER

BACKGROUND OF THE INVENTION

1. Field of the Invention

This invention relates to a coffee maker and more particularly refers to a new and improved electric coffee maker with a fresh water container, a convection heater, a coffee filter and a coffee pot in the shape of a thermos jug.

2. Description of the Prior Art

Known electric household coffee makers of this kind show a housing base with a support surface for the thermos jug and an electric flow-through heater disposed below the support surface. The fresh water container is arranged on the housing base adjacent to the support surface. The riser tube for the hot water goes upward from the housing base through the fresh water container or adjacent to it to a coffee filter which is supported by the fresh-water container or the coffee pot. In the known coffee makers of this kind, the circulating heater is arranged a bit below the lowest level of the fresh water container, so that the water pressure in it is sufficient to operate it as a tubular convection heater with the tube heating element disposed alongside of it. It must be taken into consideration that in this type of construction of a flow-through heater, the heat is applied to the ususally rather thin-walled water tube along a line and not around the circumference of the water tube. Consequently, heating is uneven with portions of the water tube intensively heated and this can easily lead to undesirable formation of steam bubbles in the hot water portion of the convection heater. The degree of formation of steam bubbles depends to a large extent on the water pressure.

SUMMARY OF THE INVENTION

An object of the present invention is to provide an efficient electric coffee maker of this type constructed to produce a more compact form.

With the foregoing and other objects in view, there is provided in accordance with the invention an electric coffee maker comprising (a) a coffee pot in the form of a Dewar flask (b) a shock-proof outer housing supporting and surrounding the coffee pot (c) a electric flow-through heater disposed below the top of the Dewar flask in the shock-proof outer housing surrounding the coffee pot (d) a fresh water container disposed above the coffee pot (e) a coffee filter disposed above the coffee pot (f) fresh water conduit means connecting the fresh water container with the flow-through heater for the passage of fresh water from the fresh water container to the heater, and (g) hot-water conduit means connecting the flow-through heater to the top of the coffee filter for the passage of hot water from the heater to the filter.

Other features which are considered as characteristic for the invention are set forth in the appended claims.

Although the invention is illustrated and described herein as embodied in an electric coffee maker, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 2 is a sectional view taken along line II—II of FIG. 1

FIG. 3 is a modification of the embodiment illustrated in FIG. 1, in which the upper portion of the coffee maker is shown in section

DETAILED DESCRIPTION OF THE INVENTION

Figure 1:
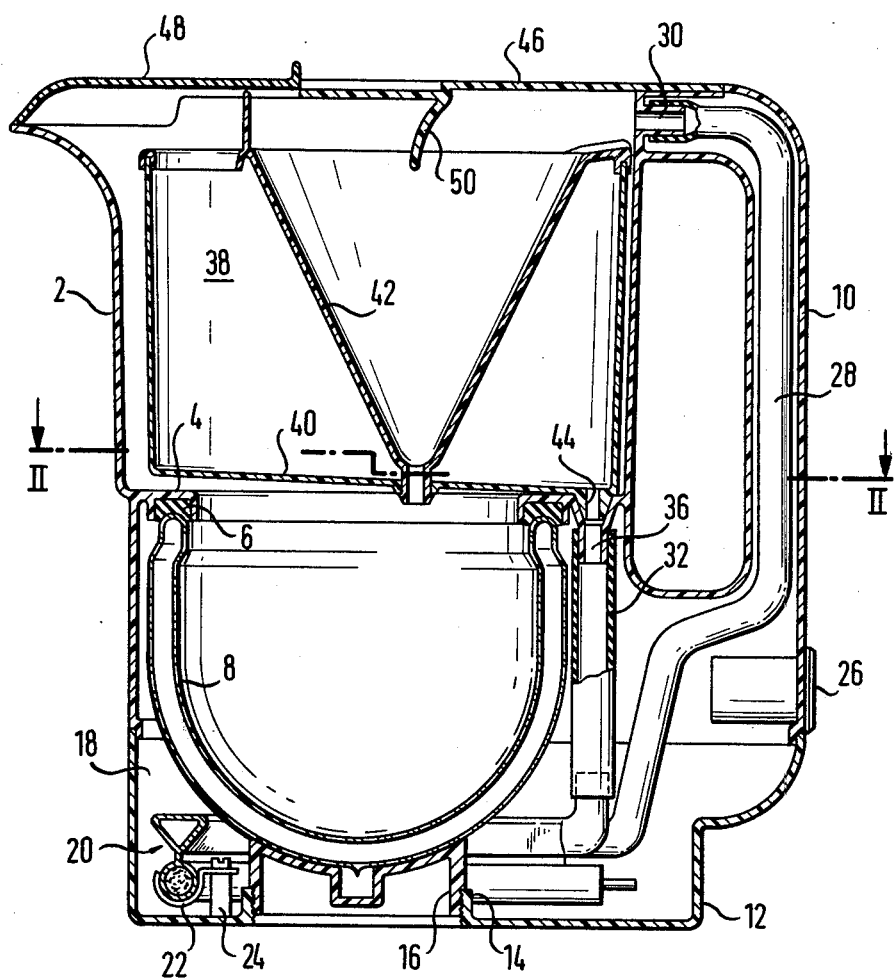
FIG. 1 is a vertical section of a coffee maker in accordance with the invention, taken along line I—I of FIG. 2

The circulating heater in the outer jug-housing is preferably in the space of the bottom rounded portion of the Dewar flask or vessel. A coffee maker constructed along this line has the advantage that it utilizes the dead space which is for technical reasons available in thermos jugs. If the fresh water container and the coffee filter are placed on top of the thermos jug a very compact coffee maker results. This is of considerable importance because of the numerous available household and kitchen appliances which usually have to be placed upon a kitchen table. An electric coffee maker wherein the fresh water container and the coffee filter are removably arranged above a thermos jug is known from German Petty Patent (Gebrauchsmuster) No. 70 25 972. However, the construction form proposed there with the convection heater arranged in the fresh water container cannot be compared with the construction according to the present invention, because for the reasons given the heating and circulating of the water is a problem, due to the low water pressure available in the convection heater.

To achieve the purpose of the invention an out-flow port of the fresh water container, preferably a bottom port, is connected with a seal to a connecting tube which leads down through the housing below the top of the jug into the convection heater. Preferably said connecting tube is disposed at the housing of the jug, i.e. made in one piece with the latter.

The riser tube through which brewing water flows can be arranged to go through the handle of the jug.

Furthermore, the housing or shell of the jug can be expanded to receive the fresh water container and/or the coffee filter. This expanded portion may be a support only for attaching, i.e. securing the fresh water container and the coffee filter, or it can enclose the fresh water container and/or coffee filter to a great extent. The first type of construction has the advantage that the coffee pot size can be made smaller by removing the fresh water container and/or the coffee filter before the coffee is served; the second solution has the advantage that the whole coffee maker has the form of a coffee jug of pleasing appearance and that also no further manipulation is required after preparing the coffee and serving it. Also no problems arise with drops of water continuing to drip after the filter is removed. For expanding the housing of the jug, the housing is preferably elongated above the upper edge of the Dewar vessel.

Since the Dewar flask is round for manufacturing reasons, it is practical to provide at the side of the outside shell in the region of the handle a vertical bulge containing a fresh water tube or conduit between the convection heater and the connection tube. The bulge can also serve for housing an electrical connector and/or electrical switching elements, as for example an on-off control.

In another advantageous embodiment of the coffee maker according to the invention, the coffee filter in the form of a flat filter is preferably arranged above the Dewar vessel or extends into the latter. The fresh water container is for its greater part above the coffee filter. This has the advantage that after removal of the fresh water container, the remaining part of the coffee maker is small and the riser tube need not be made either in parts, i.e. sections, or telescoping in order to obtain a small shape. An advantageous further development is to shape the bottom side of the fresh water container as a hot water (brewing water) leader, for example, as an overflow tube which functions as a distributor of the brewing water. This form of construction is very effective for space-saving, as well as saving material, and the hot water leader which is always fixed to the bottom of the fresh water container is well protected and does not require any special manipulation. The above-described arrangements of filter and fresh water container to each other, and the utilization of the bottom of the fresh water container as device for conducting the hot water have significance beyond the frame of this application for similarly constructed coffee makers without a Dewar vessel and achieve the objects of space-saving, material saving and simple construction.

In the following the invention is further explained with the aid of schematic drawings of embodiment examples shown in FIGS. 1–4.

In the middle portion of an outer housing 2 the coffee maker illustrated in the FIGS. 1 and 2 is shown having an inward turned flange 4 for receiving an elastic sealing ring 6, against which presses the upper edge of a Dewar vessel 8. The housing 2 extends beyond the Dewar flask 8 which occupies the lower part of the outer housing 2. The outer housing 2 of the jug is made in one piece with a handle 10, which is connected at its lower portion to a bottom part 12. In the middle portion of the bottom part 12 of outer housing 2 the Dewar vessel 8 is a large opening with threaded edges 14 into which is threaded a holding part 16 for supporting and securing the Dewar vessel 8.

Due to the semi-spherical shape of the Dewar vessel 8 a hollow space 18 is formed around the holding part 16. A convection heater 20 is disposed in hollow space 18 and secured by means of the spring brackets 22 to the ribs 24 which extend from the bottom part 12. In the lower part of the handle 10 is inserted a plug-in terminal 26 for connection to an electric source of power. The connection of terminal 26 to the convection heater 20 is not shown. A riser tube 28 leads from the convection heater 20 through the handle 10 to an overflow tube 30 in the upper end portion of the jug housing 2. A fresh water tube 32 connects the convection heater 20 with a connection tube 36 which is formed in the horizontal part of the rib 4 of the housing 2 of the jug. A removable filter 42 is snapped into the fresh water container 38 and extends down the bottom 40 of the fresh water container 38. A fresh water container 38 has a drain-tube 44 which is detachably plugged into the connecting tube 36. The outer housing 2 of the jug above the fresh water container 38 with the filter 42 inserted both above the Dewar vessel 8, is closed by a cover 46 which has a slideable spout closure 48 and a baffle rib 50 which serves to interrupt the flow of water coming out of the overflow tube 30 and direct it toward filter 42.

The outer housing 2 of the jug has a bulge 52 in the zone of the jug handle 10 which extends over its entire height, wherein the connecting tube 36 for mating with the draintube 44 of the fresh water container 38 is disposed.

In the embodiment according to FIG. 3 the outer housing 56 of the jug reaches only up to the zone of the upper edge of the Dewar vessel 8, and is adjacent to a flange 58 into which the seal 6 is inserted. Flange 58 is shaped to form a supporting spout 60 and a connecting tube 62. In addition, the flange 58 has a ring connection 63 which extends a short distance upward, approximately in continuation of the outer housing 56, and into which the lower portion of a fresh water container 64 is inserted. The fresh water container 64 has a bottom opening with a ring seal 70 into which a filter shaped insert member 68 is fitted. A sliding closure 72 can be arranged along the lower region of the side wall of the container and can function together with the pouring spout 60. A jug handle 74 which extends above the inserted fresh water container 64 is formed in the housing 56 of the jug. The riser tube 28 is carried through the handle 74. A cover 76 which opens to an overflow tube 78 at the jug handle 74 closes the filter 66 and the fresh water container 64 on top. In a coffee maker of this type the fresh-water container 64 with the wedge or conical-shaped filter 66 and filter-shaped insert member 68 can be taken off to make the coffee pot smaller, and the remaining coffee pot is covered by another cover with some closing means, not shown. The handle of the coffee maker or jug with the riser tube 28 arranged in it extends to the side of the jug. This could be avoided by arranging the handle in the lower portion of the jug alongside the Dewar vessel and providing a collapsible riser tube in known manner by making the tube telescopic so that section of the tube can slide into each other and conversely can be pulled out upward.

Figure 4:
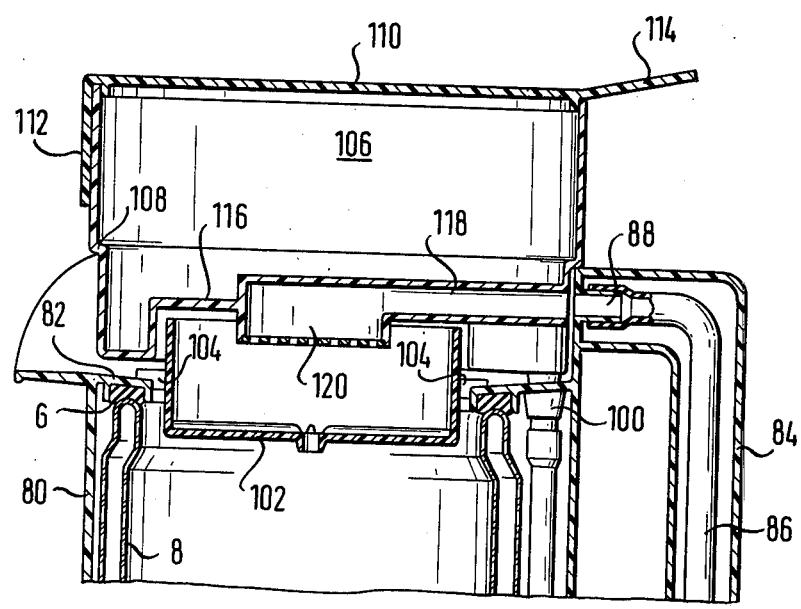
FIG. 4 is another modification illustrated in FIG. 1 showing the upper portion of the coffee maker in section.

In the variation shown in the embodiment of FIG. 4 a handle which extends above the remaining jug after the fresh water container is removed, is avoided. The jug housing 80 is formed in one piece with the flange 82 which corresponds to flange 58 in FIG. 3, and is further made in one piece with jug handle 84 which reaches to its upper edge. A riser tube 86 extends through the handle 84 to a horizontal overflow tube 88. A connecting tube 100 is positioned slightly to the back of the plane of the section. A flat filter 102 extends from the top a distance into the Dewar vessel 8 just above its maximal coffee filling level. Filter 102 seats on the horizontal part of flange 82 where it protrudes inward with positioning arms 104 which are provided at the filter side extending star-like. A fresh water container 106 seats with a small shoulder 108 of its side wall on the upper edge of flange 82 of the housing 80, and extends in continuation of the jug housing a distance upward where it is closed by a cover 110. The cover 110 fits the remaining jug when the fresh water container 106 is removed and the cover 110 is provided for this purpose with a closure lug 112. Opposite the closure lug 112, outward and slightly slanted up, extending beyond the wall of the fresh water container 106 is handle 114.

Handle 114 functions together with jug handle 84 when the cover is used as cover for the pot, and for pouring swings easily upward in the spout closure 112 when pressure with the thumb is applied to it. The bottom 116 of the fresh water container 106 extends down around the flat filter 102 for better utilization of available space, with the exception of a saddle which remains in the region of the overflow tube 88. An overflow tube 118 is formed at the bottom 116 with a chamber 120 for distributing the brewing water at its end. Even in the case of a rather sharp cornered transition between side wall and bottom of the Dewar vessel, because of the required centering and holding means which are disposed in the bottom region, enough space is available at the bottom of the Dewar vessel for installing a convection heater according to the invention.

There is claimed:

1. An electric coffee maker comprising
   (a) a coffee pot in the form of a silvered, double-walled, glass vessel, evacuated between the walls, with a rounded bottom
   (b) a shock-proof outer housing supporting and surrounding the coffee pot having a vertical wall and a flat bottom surface serving as a base for the electric coffee maker, with free space between the rounded bottom of the glass vessel and the vertical wall
   (c) an electric flow-through heater disposed below the top of the glass vessel in the shock-proof outer housing surrounding the coffee pot in the free space between the rounded bottom of the glass vessel and the vertical wall
   (d) a fresh water container disposed above the coffee pot
   (e) a coffee filter disposed above the coffee pot
   (f) fresh water connecting means connecting the fresh water container with the flow-through heater for the passage of fresh water from the fresh water container to the heater comprising a drain in the fresh water container detachably connected to a connecting tube passing through in the interior of the outer housing to and in connection with the flow-through heater, and
   (g) hot-water conduit means connecting the flow-through heater to the top of the coffee filter for the passage of hot water from the heater to the filter.

2. Electric coffee maker according to claim 1, wherein a portion of the connecting tube to which said drain is connected is formed from a horizontal rib extending from the housing.

3. Coffee maker according to claim 1, wherein the housing is elongated upward beyond the upper edge of the glass vessel, with an enlarged diameter sufficient to surround the glass vessel and also sufficient to receive and enclose the fresh water container.

4. Coffee maker according to claim 1, wherein the bottom side of the fresh water container disposed above the coffee pot is made in one piece and includes means for guiding the brewing water from the hot water conduit means to the top of the coffee filter, and wherein the coffee filter in the form of a flat-filter, is disposed between the fresh water container and the highest possible level of the brewed coffee in the coffee pot.

* * * * *